Sept. 7, 1926.
O. BILGER ET AL
STEAM ENGINE
Filed Nov. 6, 1924
1,599,275
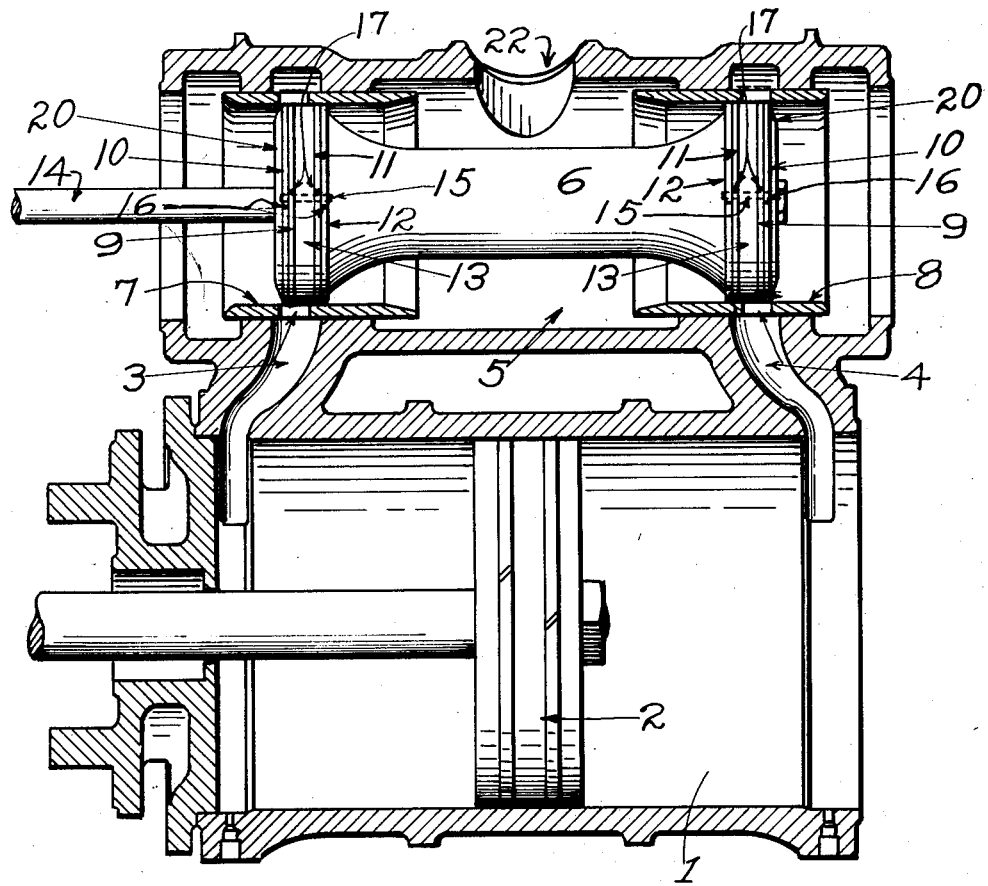
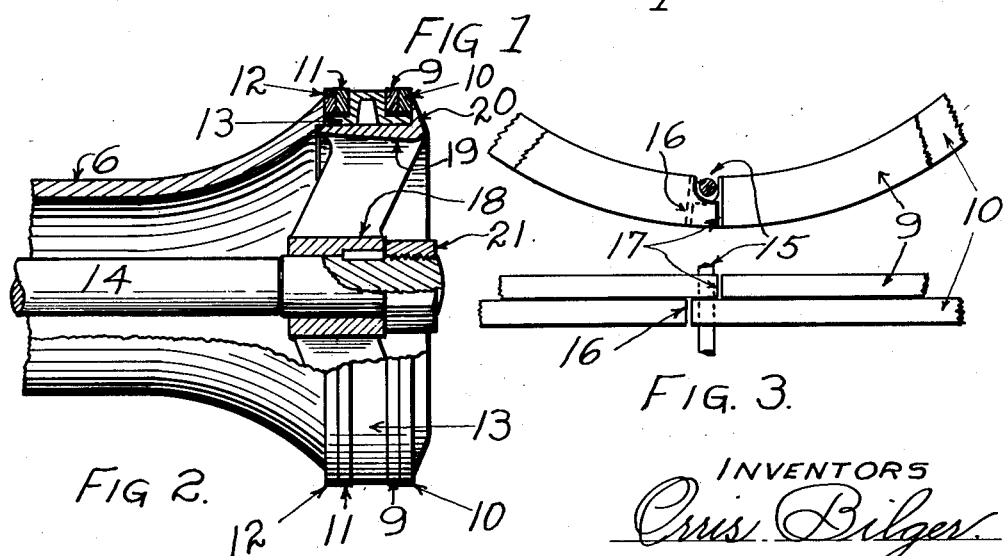
FIG 1.
FIG 2.
FIG. 3.
INVENTORS
Orris Bilger.
Frederick William Schultz
BY
ATTORNEY.

Patented Sept. 7, 1926.

1,599,275

UNITED STATES PATENT OFFICE.

ORRIS BILGER AND FREDERICK WILLIAM SCHULTZ, OF WICHITA, KANSAS.

STEAM ENGINE.

Application filed November 6, 1924. Serial No. 748,192.

This invention relates to steam engines and it comprises a piston valve for steam engines comprising a plurality of floating snap exhaust rings mounted adjacent the bull ring, to prevent the escape of steam into the exhaust port until the port is opened by the piston valve; and the invention further comprises a plurality of steam admission floating snap rings mounted adjacent the bull ring and opposite the exhaust rings, whereby, when said valve moves to close the cylinder port after the intake of steam, the back pressure at the cylinder port serves to collapse one of said intake admission rings, but the other, having passed the port opening, snaps back into place against the valve cage, thereby preventing the further intake of steam into the piston cylinder; and the invention further comprises a plurality of split rings each having a groove or seat for a dowel on the inner periphery at one end whereby when a plurality of such rings are assembled they may be held against the peripheral movement with respect to the bull ring by the dowel pin passing therethrough and resting in the recess and whereby such rings may be assembled so that the split portions of adjacent rings overlap while the dowel engages all the recesses of the rings, thus preventing leakage of steam; all as more fully hereinafter set forth and as claimed.

In order to operate a steam engine efficiently, it is essential that the entire expansive force of the steam in the piston chamber be utilized before the exhaust port is opened to allow its escape. To obtain this result it has been the common practice to extend or lengthen the exhaust lap of the valve. When this is done, the cylinder port remains closed for an appreciable length of time after the intake has been cut off and before the port is opened for exhaust. During this time, however, the valve continues its rectilinear movement and when the ring forming the exhaust lap becomes partially exposed to back pressure from the cylinder port, the concentric force of the port steam upon the wearing face of the ring tends to collapse it and to permit the escape of some of the steam into the exhaust. When such action occurs, a very considerable amount of effective piston pressure is wasted inasmuch as the partial exhaust takes place before the piston has completed its stroke.

In the conventional steam engine construction, the piston valve is provided at each end with a bull ring, a single steam admission ring and a single exhaust ring. With such construction, however, the exhaust ring will collapse when about one-fourth of its width is drawn over the valve cage ports. This is due to the port pressure acting upon the outside of the ring. The tremendous loss of power resulting from the collapse of the exhaust ring is at once apparent when consideration is taken of the fact that in the present locomotive engine, (for instance) the piston travels about eight inches in a thirty-three per cent cut off, from the time that the inside edge of the single exhaust ring is exposed to port pressure until the moment the exhaust edge is exposed. The single exhaust ring now substantially universally used in locomotive engines is from five-eighths of an inch to eleven-sixteenths of an inch in width and is mounted on a valve having a range of travel of from two and three-fourths inches to six inches. About one-fourth of the width of the exhaust ring will present sufficient surface to the port steam to close or collapse the ring, and consequently, steam will escape to exhaust in from five and one-half inches of piston travel to six inches of piston travel sooner than it should. The retention and use of all of the steam in the piston cylinder during these five and one-half to six inches of piston travel is fully accomplished by the use of two or more adjacent exhaust snap rings.

In the conventional construction of the piston valve, embodying but a single admission steam ring, the back pressure from the cylinder port collapses such ring when worn sufficiently and the single admission steam ring will not again snap back to its original position until it is moved almost entirely past the cylinder port. For this reason, a double floating snap steam admission ring construction is provided, whereby, when one of the said snap rings has passed the cylinder port, it will snap back into close engagement with the port cage bushing and the second of the two snap rings, then being exposed to port pressure, may be collapsed without further intake of steam into the piston cylinder. This results in the piston travelling six and one-half inches in a thirty-three per cent cut off without the admission of more steam to the cylinders.

It is the object of the present invention to provide a piston valve, which will not permit the premature escape of steam from the piston chamber.

It is a further object of the present invention to provide a piston valve which will effectively cut off the intake of steam into the piston cylinder and without leakage.

It is a further object of the present invention to arrange the rings so that a single dowel may be used to prevent their movement in the bull ring but at the same time position adjacent rings with respect to each other so that split ends overlap to prevent the escape of steam.

A still further object is to provide a steam engine valve which is simple in construction and efficient in operation, and which increases the efficiency of the steam engine from the standpoint of power and economy in fuel; and to provide a valve which will prevent necessity of frequent replacement of the rings.

These objects are attained in the manner to be described, reference being made to the accompanying drawing, in which Figure 1 is a sectional view of a preferred form of the present invention assembled on a steam power plant.

Figure 2 is a view, partly in section, of one end of the piston valve shown in Figure 1, showing bull ring and auxiliary steam admission snap rings and exhaust snap rings in assembled position, and Figure 3 is a view, showing the manner in which the offset recess is made in the snap rings, at the split for the dowel, whereby the adjacent rings engage the dowel in such a way that the split in one snap ring staggers the split in adjacent snap ring.

Referring to the drawings:

Steam cylinder 1 is provided with a piston 2 and at each end with steam ports 3 and 4, communicating with a valve chamber 5, which in turn, has a reciprocating valve 6 mounted therein. The valve moves in port cage bushings 7 and 8 which overlie the steam ports 3 and 4 respectively, and which are formed with openings for the intake and exhaust of steam. Steam is admitted to the valve chamber through opening 22 and alternately to chamber 1 through ports 3 and 4.

Valve 6 is hollow and its end flanges are flared as shown more particularly in Figure 2. A head member is formed by a central hub 18 and a circumferential flange 19 having formed integrally therewith a radially extending circumferential flange 20. The hub 18 is keyed to rod 14 and is held in fixed position by nut 21.

In the annular groove formed by the flared body portion 6 of the valve and the body portion of the bull ring 13 are mounted a plurality of floating snap rings designed to prevent leakage of steam. As shown in detail in Figure 2, they comprise a bull ring 13 of inverted U-shape and having lateral flanges, which extend the width of the groove formed by member 6 and flange 20. Between the raised portion of bull ring 13 and the body portion of valve 6 are mounted two adjacent floating snap rings 11 and 12, which form the function of a steam lap, or steam admission ring, while between the raised portion of the bull ring 13 and the flange 20 there are mounted two adjacent snap rings 9 and 10 which comprise the exhaust end of the valve. It is the usual practice to provide the piston valve with but one exhaust ring, or where in certain types of engines employing more than one piston ring, to use integral (not snap) rings. When, however, with such construction the valve starts to move and before reaching full exhaust the ring moves across the exhaust port until about one-fourth of its width is exposed to the port pressure of steam acting concentrically upon wearing face of exhaust ring, the ring is collapsed in its seat and steam escapes prematurely. With our construction such waste energy is prevented. The premature escape of steam being prevented results in increased engine efficiency. All the available working energy of the steam during the pressure stroke is utilized since, through the provision of the means described, the snap rings of the valve constituting the packing are caused to positively engage the port cage bushing and when subjected to direct port pressure, the outer ring is prevented from collapsing.

By cutting the offset recesses at the ends of the split rings as shown at 16 and 17 (Figure 3) one dowel 15 passing through the bull ring and seated in the recesses or shoulders thus formed may be used, and split ends of adjacent rings may be staggered with respect to each other and the escape of steam between the rings be thus prevented.

In assembling the rings, the dowel being in position, the rings are placed on the piston valve adjacent each other and adjacent rings being reversed so that while there is a continuous seat through all the rings engaging the dowel pins, nevertheless the split portions of the adjacent rings overlap.

While ordinarily we employ the ring described both as exhaust and pressure rings, we may nevertheless dispense with these rings as pressure rings and secure the advantages of the invention by simply using the adjacent split snap rings as exhaust rings on the piston valve.

What we claim is:—

1. The combination with a steam engine cylinder having ports in one side, and a piston movable in said cylinder between said ports, of valve cage bushings having ports registering with those in the cylinder, and a piston valve having opposite end heads controlling said ports, each valve head having a bull ring provided with reduced ends forming annular grooves, two floating adjacent snap rings seated in both the inner and outer end grooves, one of which is collapsible independently of the other to prevent a premature escape of steam from the engine cylinder.

2. The combination with a steam engine cylinder having ports, of a valve cage bushing having ports registering with those in the cylinder, a piston valve comprising a main body or stem portion, separate bull rings mounted at opposite ends of the stem portion, each bull ring having its opposite ends reduced in diameter to form annular grooves, and a plurality of floating adjacent snap rings in each groove, the ring initially presented to port pressure being independently collapsible to prevent a premature escape of steam from the engine cylinder.

3. The combination with a steam engine cylinder having ports on one side, of valve cage bushings having ports registering with those in the cylinder, and a valve having opposite heads controlling said ports, said valve heads each having a bull ring provided at each end with an annular groove, a plurality of floating adjacent snap rings in each groove so arranged that when the inner exhaust ring passes the port opening and is collapsed the outer exhaust ring or rings will remain expanded and in contact with the cage bushing until they too have passed the port opening.

4. The combination with a steam engine cylinder having ports on one side, of valve cage bushings having ports registering with those in the cylinder, and a piston valve having opposite heads controlling said ports, each valve head having a bull ring provided at each end with an annular groove, a plurality of floating adjacent snap rings in each groove so constructed that when the valve moves to close the cylinder port after the intake of steam the back pressure at the cylinder port serves to collapse one of said rings but the other or others, having passed the port opening, snap back into place against the valve cage bushing.

5. The combination with a steam engine cylinder having ports in one side, and a piston movable in said cylinder between said ports, of valve cage bushing having ports registering with those in the cylinder, and a piston valve having opposite end heads controlling said ports, each valve head having a bull ring provided with reduced ends forming annular grooves, two floating adjacent split snap rings seated in each groove, said rings being recessed near the slit portion and fixed means in the recesses to hold the rings so that the ends of adjacent rings will be in staggered relation.

6. The combination with a valve cage bushing provided with a port through which steam is admitted under pressure, of a valve head slidable in said bushing to control said port, ring holding means in said valve head and a plurality of floating adjacent snap rings in said means so constructed that when the valve head slides into such position that the first ring registers with the port and is collapsed by the steam pressure therein the adjacent ring or rings remain snapped out against the bushing until they too are brought into register with the port.

7. The combination with a valve cage bushing provided with a port through which steam is admitted under pressure, of a valve head slidable in said bushing to control said port, a plurality of split rings mounted in abutting relation on said valve head each of said rings being grooved, and a dowel pin adapted to register with the grooves in said abutting rings whereby, when the rings are assembled on the valve head they may be held against peripheral movement and in such manner that the split portions thereof overlap the ring initially presented to port pressure being independently collapsible to prevent a premature escape of steam from the engine cylinder.

8. The combination with a valve cage bushing provided with a port through which steam is admitted under pressure, of a valve head slidable in said bushing to control said port, the said valve head being formed with a peripheral groove, of a bull ring seated in said groove and defining a space on either side thereof, a plurality of split spring rings mounted in abutting relation in said spaces, the said spring rings being each provided with a groove in its inner periphery, and a dowel pin adapted to be received in the aligned grooves of said abutting rings whereby, when assembled, they are so positioned that the split portions thereof overlap the ring initially presented to port pressure being independently collapsible to prevent a premature escape of steam from the engine cylinder.

In testimony whereof, we have hereunto affixed our signatures.

ORRIS BILGER.
FREDERICK WILLIAM SCHULTZ.